United States Patent [19]

Yoshimura

[11] Patent Number: 6,126,071
[45] Date of Patent: Oct. 3, 2000

[54] IC MEMORY CARD SYSTEM FOR AUTHENTICATING AN IC MEMORY CARD, AND IC MEMORY CARD USED FOR THE SAME

[75] Inventor: Yoshimasa Yoshimura, Tokyo, Japan

[73] Assignee: Mitsubishi Denki Kabushiki Kaisha, Tokyo, Japan

[21] Appl. No.: 09/195,211

[22] Filed: Nov. 18, 1998

[30] Foreign Application Priority Data

May 25, 1998 [JP] Japan .................................. 10-142716

[51] Int. Cl.$^7$ ...................................................... G06K 5/00
[52] U.S. Cl. ......................... 235/382; 235/380; 235/492
[58] Field of Search ................................ 235/380, 382, 235/492, 379; 380/46; 705/66, 67; 713/169; 902/1, 2, 26, 39

[56] References Cited

U.S. PATENT DOCUMENTS

| | | | |
|---|---|---|---|
| 4,827,113 | 5/1989 | Rikuna | 235/379 X |
| 5,046,094 | 9/1991 | Kawamura et al. | 380/46 |
| 5,148,007 | 9/1992 | Kruse | 235/382 |
| 5,288,978 | 2/1994 | Iijima | 235/380 |
| 5,293,029 | 3/1994 | Iijima | 235/380 |
| 5,396,558 | 3/1995 | Ishiguro et al. | 705/67 |
| 5,446,796 | 8/1995 | Ishiguro et al. | 705/66 |
| 5,799,085 | 8/1998 | Shona | 713/169 |
| 5,914,471 | 8/1998 | Van De Pavert | 235/380 |

FOREIGN PATENT DOCUMENTS 9-179950  7/1997  Japan .

*Primary Examiner*—Michael G Lee
*Assistant Examiner*—Jared J. Fureman
*Attorney, Agent, or Firm*—McDermott, Will & Emery

[57] ABSTRACT

An IC memory card and an IC memory card system prevent the use of unauthorized or illegal copies or forgeries of IC memory cards storing original content. Using a key value selected by a terminal device of the IC memory card system, the terminal device calculates a first value and the IC memory card separately calculates a third value by applying a particular method to the key value. Second and fourth values are similarly calculated using a different particular method. The IC memory card then determines whether the first and third values are the same. The terminal device separately determines whether the second and fourth values are the same. Only if the first and third values are confirmed to match, and then the second and fourth values are also confirmed to match, does the terminal device recognize the IC memory card as an authentic IC memory card and not an unauthorized or illegal copy or forgery.

12 Claims, 2 Drawing Sheets

IC MEMORY CARD SYSTEM FOR AUTHENTICATING AN IC MEMORY CARD, AND IC MEMORY CARD USED FOR THE SAME

BACKGROUND OF THE INVENTION

1. Field of the Invention

The present invention relates to an integrated circuit (IC) memory card system whereby particular functionality is provided by combining a specific IC memory card with a specific terminal device, and relates to an IC memory card used by said IC memory card system. Examples of such IC memory cards and corresponding system (terminal) devices include printers and font cards, game machines and game cards, and car navigation systems and map data cards.

2. Description of the Related Art

IC memory cards are readily available today, and are used to store both proprietary and user data. IC memory cards can be used, for example, as compact external storage for user data generated with a personal computers, or as a medium for storing proprietary (copyrighted) font data for printers or even program code (software applications). IC memory card systems that provide or perform a particular function when a specific IC memory card is used in combination with a certain system device (terminal) are also available. A printer and a font card, a game machine and a game card, and a car navigation system with an IC memory card storing map data are examples of such IC memory card systems designed to perform a particular function with a particular IC memory card.

IC memory cards used with such IC memory card systems comprise primarily ROM chips for data storage. The unit cost of manufacturing the IC memory card itself is thus low while the cost of developing the data or software stored to the IC memory card is typically high. As a result, the ultimate end-user cost of such IC memory cards is generally high when compared with the cost of a blank IC memory card.

This makes it possible for a third-party to duplicate or forge high-cost IC memory cards for profitable sale at a price lower than the cost of the original card by simply copying data or software from an original IC memory card to a blank IC memory card. The original IC memory card developer is thus prevented from realizing the profits that would otherwise be derived from authorized sales, and is thus subject to potentially significant economic loss. To prevent such losses, it is necessary to prevent unauthorized duplication, copying, and forgery by third parties of original content stored to IC memory cards.

There has therefore been a need for an IC memory card and an IC memory card system whereby unauthorized reproduction of IC memory card content can be prevented.

There has been a further need for an IC memory card and an IC memory card system whereby use of unauthorized or illegally copied or forged IC memory cards can be prevented.

Attempting to address this problem of unauthorized duplication of IC memory card content, Japanese Patent Laid-Open Publication No. 9-179950 teaches an IC card and service provider device, such as a reader/writer device, whereby the IC card and service provider device apply a specific encryption function to a supplied random number, compare the calculated results, and confirm mutual authenticity when the results match.

It should also be noted that Japanese Patent Laid-Open Publication No. 4-191787 teaches a public key generating system and public key generating method whereby a public key is generated using terminal-specific public information and public information from a terminal information issuing center.

SUMMARY OF THE INVENTION

To meet the above described need, an object of the present invention is to provide an IC memory card system whereby a terminal device and an IC memory card perform a specific authentication procedure, normal operation is only enabled once the terminal device confirms that the IC memory card is authentic, and use of unauthorized copies and forgeries of authentic IC memory cards is thus prevented.

A further object of the invention is to provide an IC memory card used with the above-noted IC memory card system.

To achieve the above object, an IC memory card system according to the present invention comprises a terminal device and an IC memory card connected thereto. The terminal device is typically some type of information processing device, and the IC memory card is used connected to the terminal device. When the terminal device detects that an IC memory card has been connected, it selects a key value and calculates a first value and a second value based on the key value using different particular calculating methods. The key value and first calculated value are then passed to the connected IC memory card. The IC memory card then calculates a third value and a fourth value using different particular methods based on the key value from the terminal device, and compares the first value received from the terminal device with the internally calculated third value. If the compared first and third values are the same, the IC memory card passes the calculated fourth value to the terminal device. The terminal device then compares the second value calculated by the terminal device with the fourth value supplied from the IC memory card, and prohibits use of the connected IC memory card if the compared values are not the same.

In other words, a first value and a third value are calculated by the terminal device and IC memory card using a particular method, and the second and fourth values are similarly calculated by the terminal device and IC memory card using a different particular method. Each of these values is determined using a key value selected by the terminal device. The IC memory card determines whether the first and third values are the same, and the terminal device determines whether the second and fourth values are the same. Only once the first and third values are determined to match and the second and fourth values are also determined to match is the IC memory card recognized by the terminal device as an authentic IC memory card.

It is therefore possible to implement an IC memory card verification process that is difficult to decipher while keeping the structure and cost of the IC memory card simple and low. By thus preventing use of unauthorized or illegal copies or forgeries of original IC memory cards, the profits of the developer and manufacturer of original-content IC memory cards and IC memory card systems can be protected.

The IC memory card system of the invention can be alternatively configured such that the IC memory card prohibits sending the fourth value to the terminal device when it determines that the first value input from the terminal device does not match the third value calculated by the IC memory card. This causes the terminal device to prohibit use of the IC memory card because said fourth value is not received from the IC memory card.

The IC memory card of the IC memory card system described above preferably comprises key value storage for storing a selected key value supplied from the terminal device; first value storage for storing a first value supplied from the terminal device; a third value operator for calculating a third value using a particular method based on the key value stored to the key value storage; a fourth value operator for calculating a fourth value based on the key value using a particular method different from that used by the third value operator; fourth value storage for storing the fourth value calculated by the fourth value operator; and a comparator for detecting whether the first value stored to the first value storage and the third value calculated by the third value operator are a same value. The comparator in this version prohibits output of the fourth value stored to the fourth value storage to the terminal device when the compared values are determined to be different.

The first and third values are separately calculated based on the key value using the same particular method, and the second and fourth values are preferably separately calculated based on the key value using a same particular method that is different from the method used for calculating the first and third values. More specifically, the first through fourth values are preferably calculated based on a key value using arithmetic functions.

When thus comprised, it is possible to implement an IC memory card verification process that is difficult to decipher, and unauthorized or illegal copies or forgeries of original IC memory cards can be used.

In a further version of an IC memory card system according to the present invention, the key value is a value encrypted using a particular method, the first and third values are obtained by decrypting the encrypted key value using a particular method, and the second and fourth values are calculated using a particular arithmetic function based on the key value. Alternatively, the first and third values are calculated using a particular arithmetic function based on the key value, and the second and fourth values are obtained by decrypting the encrypted key value using a particular method.

The IC memory card of the invention can be alternatively configured to supply the fourth value to the terminal device in response to a request from the terminal device when the first value supplied from the terminal device and the third value are determined to be a same value, or can calculate the third value using the same method used to calculate the first value based on a key value.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which.

DESCRIPTION OF THE PREFERRED EMBODIMENTS

Figure 1:
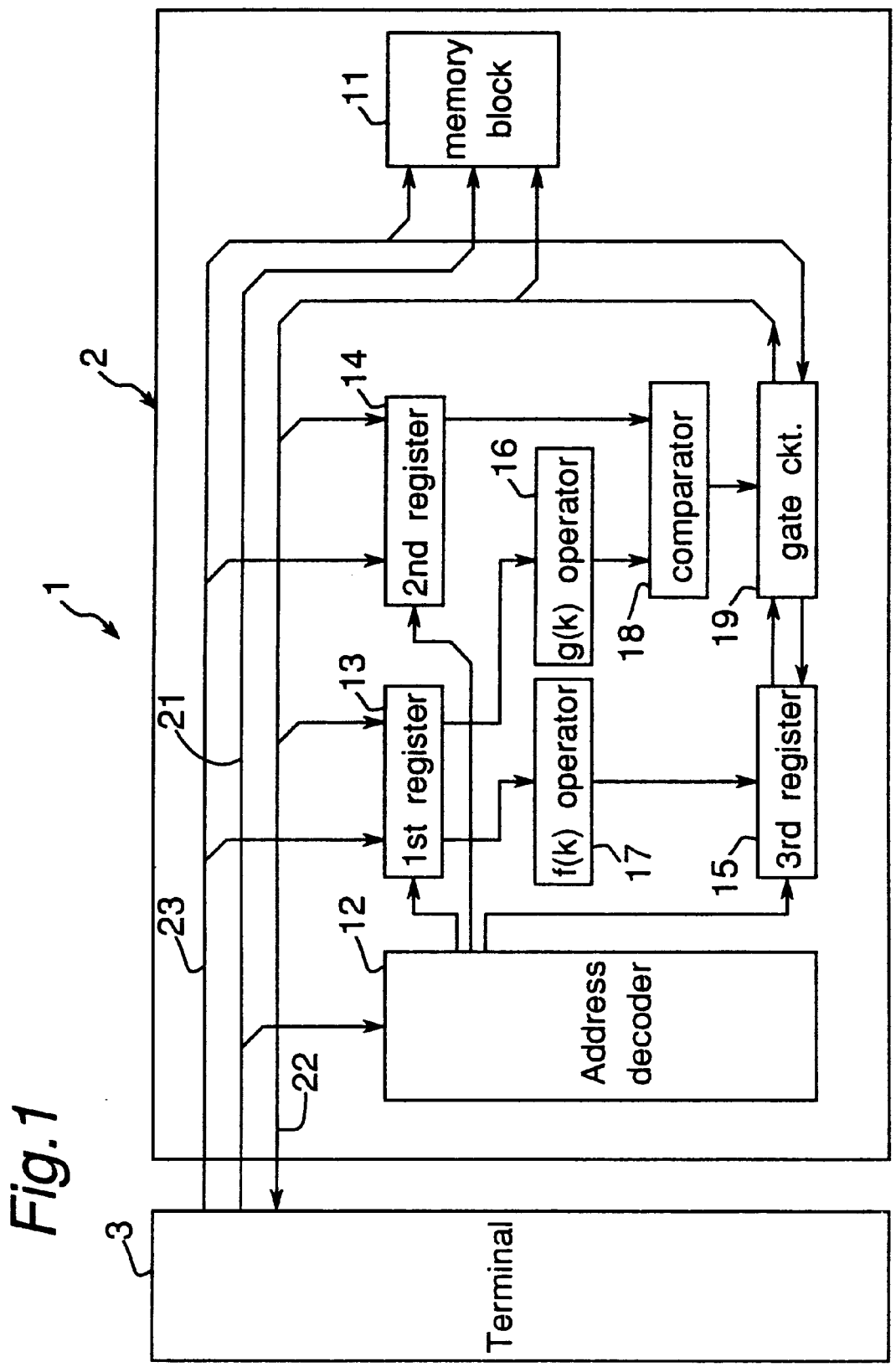
FIG. 1 is a typical block diagram of an IC memory card system according to a preferred embodiment of the present invention.

FIG. 1 is a typical block diagram of an IC memory card system 1 according to the present invention. As shown in FIG. 1, this IC memory card system 1 comprises an IC memory card 2 and a terminal 3. The IC memory card 2 is electrically connected to the terminal 3, and the terminal 3 achieves particular functionality by using the data previously stored to the IC memory card 2. The terminal 3 discriminates whether the connected IC memory card 2 is an authentically produced card. If the terminal 3 determines that the IC memory card 2 is not an authorized copy, the terminal 3 stops use of the IC memory card 2; if the IC memory card 2 is authentic, the terminal 3 controls operation of the IC memory card 2 to realize the specific functionality enabled by the card.

The IC memory card 2 comprises a memory block 11, address decoder 12, first register 13, second register 14, third register 15, a g(k) operator 16, f(k) operator 17, comparison circuit 18, and gate circuit 19.

The data required for the terminal 3 to perform the particular function enabled by the card is stored to the memory block 11.

The g(k) operator 16 calculates the value g(k) of a particular function g applied to key data k supplied from the terminal 3. The f(k) operator 17 likewise calculates the value f(k) of a particular function f applied to key data k supplied from the terminal 3.

The comparison circuit 18 controls the gate circuit 19.

It should be noted that while the IC memory card 2 is electrically connected as described above to the terminal 3, the connectors or other connecting means are not shown in the figure. In addition, functions f and g are different functions.

The memory block 11 is connected to the terminal 3 by an address bus 21, data bus 22, and a control signal bus 23 having a plurality of signal lines.

The address decoder 12 is connected to the first register 13, second register 14, and third register 15 by the address bus 21.

The first register 13 is connected to the g(k) operator 16 and f(k) operator 17, and to the data bus 22 and control signal bus 23.

The second register 14 is connected to comparison circuit 18, and to the data bus 22 and control signal bus 23.

The comparison circuit 18 is connected to the g(k) operator 16 and gate circuit 19. The f(k) operator 17 is connected to the third register 15, which is connected to the gate circuit 19. The gate circuit 19 is connected to the data bus 22 and control signal bus 23.

The memory block 11 comprises one or more IC memory chips, and receives via the control signal bus 23 such control signals as a card enable signal CDE#, output enable signal OE#, and write enable signal WE#. Address data is also supplied to the memory block 11 from the terminal 3 using the address bus 21. Data input/output with the terminal 3 is accomplished using the data bus 22. It should be noted that the hash mark (#) on the card enable signal CDE#, output enable signal OE#, and write enable signal WE# indicates signal level inversion, i.e., that the signal is active low.

The address decoder 12 generates and outputs an enable signal for the first register 13, second register 14, and third register 15 based on address data applied thereto from the address bus 21. The first register 13 is used to store the key data k from the terminal 3, and the second register 14 stores the value g(k) from the terminal 3. The third register 15 stores the value f(k) calculated by the f(k) operator 17.

The comparison circuit 18 compares the value g(k) stored to the second register 14 from the terminal 3 with the value g(k) calculated by the g(k) operator 16, and controls the gate circuit 19 according to the result.

The gate circuit 19 controls applying the output enable signal OE# from the control signal bus 23 to the third register 15, and output of the value f(k) stored to the third register 15 to the data bus 22. It should be noted here that the first register 13 regularly outputs the stored data to the g(k) operator 16 and the f(k) operator 17, and the second register 14 regularly outputs the stored data to the comparison circuit 18. The third register 15 regularly updates the data stored thereto from the f(k) operator 17.

The operation whereby the an IC memory card system 1 confirms the authenticity of an IC memory card 2 connected thereto when an IC memory card 2 is connected to the terminal 3 is described next below.

When the terminal 3 detects that an IC memory card 2 has been connected, it selects a key data value k and calculates the value g(k) obtained by applying a particular function g to the selected key k. The terminal 3 then outputs an address in the first register 13 where the selected key k is stored to the address bus 21, sends a low write enable signal WE# to the control signal bus 23, and then sends the key value k to the data bus 22.

The address decoder 12 decodes the address data from the address bus 21, and enables only the first register 13. The first register 13 therefore stores the key k from the data bus 22 when the low write enable signal WE# is applied from the control signal bus 23 to the first register 13. The terminal 3 then sends the address in the second register 14 at which the calculated value g(k) is stored to the address bus 21, sends a low write enable signal WE# to the control signal bus 23, and sends the value g(k) to the data bus 22.

The address decoder 12 decodes the address data from the address bus 21, and enables only the second register 14. The second register 14 therefore stores the value g(k) from the data bus 22 when the low write enable signal WE# is applied from the control signal bus 23. Once the key value k is stored to the first register 13, the first register 13 passes the key to the g(k) operator 16 and to the f(k) operator 17. The g(k) operator 16 then calculates and passes the value g(k) to the comparison circuit 18. The f(k) operator 17 similarly calculates and passes the value f(k) to the third register 15.

The comparison circuit 18 compares the value g(k) calculated by the g(k) operator 16 with the value g(k) stored to the second register 14. If the values are the same, the comparison circuit 18 enables the gate circuit 19. The gate circuit 19 then applies the low output enable signal OE# from the terminal 3 to the third register 15, and when requested by the terminal 3 supplies the value f(k) from the third register 15 to the data bus 22.

If the comparison circuit 18 determines that the compared values g(k) are different, the comparison circuit 18 stops operation of the gate circuit 19. The gate circuit 19 thus interrupts the output enable signal OE# to the third register 15, thereby preventing output of the value f(k) from the third register 15 to the data bus 22, and thus interrupting the connection between the third register 15 and data bus 22.

After sending the key value k and value g(k) to the IC memory card 2, the terminal 3 calculates the value f(k) by applying function f to the key k. The terminal 3 also sends an address in the third register 15 to the address bus 21, sends a low output enable signal OE# to the control signal bus 23, and reads the value f(k) calculated by the IC memory card 2 from the third register 15. The terminal 3 then compares the read value f(k) and the calculated value f(k). If the values are the same, the terminal 3 confirms that the IC memory card 2 is authentic, and enables normal operation of the IC memory card 2. However, if the values differ, the terminal 3 determines the IC memory card 2 not authentic, stops operation of the IC memory card 2, and thus prevents using the IC memory card 2.

It should be here noted that functions g and f are arithmetic functions or a combination thereof in an exemplary embodiment, for example, a combination of power, product, and sum operations. An exemplary function is shown in equation 1 below.

$$S(k) = C_n * k^n + C_{n-1} * K^{n-1} + \ldots C_1 * K^1 + C_0 \tag{1}$$

where n is an integer value, and $C_n$ is any desired value.

The invention shall not be limited to such functions as described above, however, and can use matrix operations on a k bit matrix or other type of bit operation applied to the key value k. An exemplary function of this type is shown in equation 2 below.

$$S(k) = \begin{pmatrix} G00 & \cdots & G0N \\ \vdots & \cdots & \vdots \\ GM0 & \cdots & GMN \end{pmatrix} \begin{pmatrix} k0 \\ \vdots \\ kN \end{pmatrix} = \begin{pmatrix} y0 \\ \vdots \\ yN \end{pmatrix} \tag{2}$$

where G00 to GMN are specific matrix values, and k0 to kN are matrix values indicative of the key value k. Note, further, that in equations 1 and 2 above S(k) can be either g(k) or f(k).

The terminal 3, g(k) operator 16, and f(k) operator 17 thus use either equation 1 or equation 2 above to calculate the values g(k) and f(k) from key k using different methods. For example, value g(k) might be calculated using equation 1 while value f(k) is calculated using equation 2.

It should be further noted that the value g(k) calculated by the terminal 3 is the first value of the claims, the value f(k) calculated by the terminal 3 is the second value, the value g(k) calculated by the g(k) operator 16 is the third value, and the value f(k) calculated by the f(k) operator 17 is the fourth value. In addition, the first register 13 operates as the key value storage of the claims, the second register 14 as a first value storage, and the third register 15 as the fourth value storage. Additionally, the g(k) operator 16 operates as the third value operator, the f(k) operator 17 as a fourth value operator, and the comparison circuit 18 and gate circuit 19 as a comparator of the claims.

Figure 2:
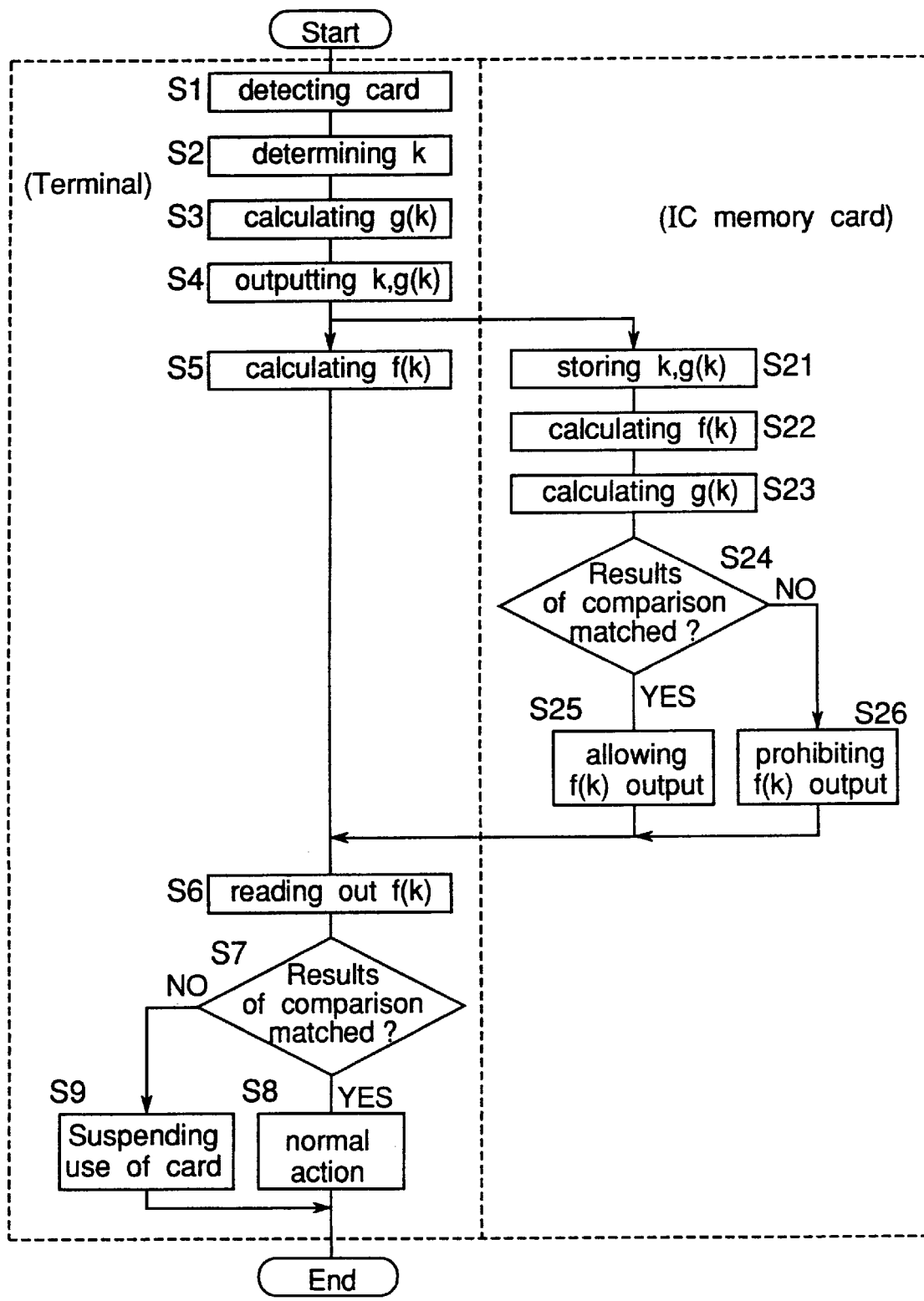
FIG. 2 is a flow chart of an exemplary authentication procedure for an IC memory card in the IC memory card system device shown in FIG. 1.

FIG. 2 is a flow chart referenced below to describe the method whereby the an IC memory card system 1 shown in FIG. 1 verifies the authenticity of an IC memory card 2 connected to the terminal 3. It should be further noted that to simplify description of the operations of the IC memory card 2 and terminal 3, operations performed by the IC memory card 2 and operations performed by the terminal 3 are shown as separate parts of a single process.

The procedure starts when an IC memory card 2 is connected to the terminal 3, and the terminal 3 then detects that a IC memory card 2 is connected (step S1) the terminal 3 then selects a key value k (step S2), and calculates the value g(k) using a particular method (step S3).

The terminal 3 then stores the key value k to the first register 13 and the calculated value g(k) to the second register 14 (step S4). This is accomplished by the terminal 3 sending a low write enable signal WE# to the control signal bus 23 to enable writing the key value k to the first register 13, sending the address in the first register 13 to the address bus 21, and then sending the key value k to the data bus 22. This is followed by the terminal 3 sending a low write enable signal WE# to the control signal bus 23 for storing the value g(k) to the second register 14, then sending the address in the second register 14 to the address bus 21, and finally sending the value g(k) to the data bus 22.

The IC memory card 2 thus stores the key value k from the terminal 3 to the first register 13, and stores the value g(k) to the second register 14 (step S21). More specifically, when an active-low write enable signal WE# instructing a data write operation is detected from the control signal bus 23 and the address decoder 12 detects that the first register 13 is addressed for the write operation based on the address value received from the address bus 21, the address decoder 12 enables writing to only the first register 13. The first register 13 then stores the key value k when it is received from the data bus 22. The second register 14 is similarly enabled based on the detected address value by the address decoder 12 when a low write enable signal WE# is detected. As a result, the second register 14 receives and stores the value g(k) from the data bus 22.

The f(k) operator 17 then reads the stored key value k from the first register 13, calculates the value f(k) using a particular method, and stores the calculated value f(k) to the third register 15 (step S22).

The g(k) operator 16 then reads the key value k from the second register 14, calculates the value g(k) using a particular method, and applies the calculated value g(k) to the comparison circuit 18 (step S23).

The comparison circuit 18 then reads and compares the value g(k) stored to the second register 14 from the terminal 3 with the internally calculated value g(k) supplied by the g(k) operator 16 of the IC memory card 2 (step S24). If the values match (YES), the comparison circuit 18 enables the gate circuit 19, thereby connecting the third register 15 to the data bus 22 and control signal bus 23 (step S25). Control is thus passed back to the terminal side at step S6.

If the comparison circuit 18 does not detect matching values (NO), however, the comparison circuit 18 stops operation of the gate circuit 19, thereby interrupting connection of the third register 15 to the data bus 22 and control signal bus 23 (step S26). Control is then passed back to the terminal side at step S6.

While steps S21 to S26 are being performed by the IC memory card 2, the terminal 3 calculates the value f(k) from the selected key value k using a particular method (step S5).

The terminal 3 then sends an active low output enable signal OE# to the control signal bus 23 while sending an address in the third register 15 to the address bus 21 to red the value f(k) stored to the third register 15 (step S6).

The terminal 3 then compares the value f(k) received from the IC memory card 2 with the value f(k) calculated in step S5 (step S7). If the values match (YES), the IC memory card 2 is verified to be authentic, normal operation of the IC memory card 2 is enabled (step S8), and the procedure stops.

However, if the values do not match or a value f(k) was not supplied from the IC memory card 2 (NO in step S7), the terminal 3 determines that the IC memory card 2 is not authentic and prohibits use of the IC memory card 2 (step S9). The procedure then ends.

It will be obvious that while the present invention has been described with discrete registers for the key value k and calculated value g(k), that is, storing the key value k to a first register 13 and the value g(k) to a second register 14, the invention shall not be so limited as both the key value k and value g(k) can be stored to a single register. In this case the terminal 3 can simultaneously write both the key value k and value g(k) to the IC memory card 2 with a single write operation when storing these values to the IC memory card 2. It should be noted, however, that the length of the k and g(k) values are limited in this case.

It will be obvious from the above description that in an IC memory card system according to a preferred embodiment of the present invention both the IC memory card 2 and terminal 3 separately calculate using specific methods a value g(k) and a value f(k) for a key value k selected by the terminal 3. The IC memory card 2 then determines whether the separately calculated values g(k) are the same, and the terminal 3 determines whether the separately calculated values f(k) are the same. The terminal 3 then determines that the connected IC memory card 2 is authentic only after the g(k) values match and the f(k) values match.

As a result, it is possible to provide IC memory cards and an IC memory card system that feature a simple configuration and low production cost and yet are extremely resistant to decryption of the IC memory card verification procedure. The IC memory card system can thus prevent use of unauthorized copies and forgeries, and the profits of the developer and authorized publisher of the original IC memory cards and IC memory card system can be protected.

It should be noted that function g and function f in the preceding embodiment are described as being different arithmetic functions, but the invention shall not be so limited. Values g(k) and f(k) can, for example, be the decrypted values of a key value k encrypted using a known method. More specifically, key value k can be encrypted using an RSA public key encryption method with key value k accordingly decrypted for use. Note that the RSA public key encryption method is known in the literature, and further description thereof is thus omitted below. The values g(k) and f(k) for a key value k are defined by equation 3 below.

$$S(k) = k^d \mod n \quad (3)$$

where d is the decryption key, and n is the encryption key. Note, further, that S(k) can be either g(k) or f(k).

In this case, the terminal 3, g(k) operator 16, and f(k) operator 17 use one of the equations 1 to 3 above to calculate g(k) and f(k) from the key value k using different methods. For example, g(k) could be calculated using equation 1, and f(k) using equation 3.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An IC memory card system comprising a terminal device and an IC memory card connected thereto, the terminal device selecting a key value,
　calculating a first value based on the key value using a particular calculating method,
　calculating a second value based on the key value using a different particular calculating method, and
　supplying the key value and first calculated value to the IC memory card;

the IC memory card calculating a third value and a fourth value using different particular methods based on the key value from the terminal device,
　comparing the first value received from the terminal device with the calculated third value, and
　supplying the calculated fourth value to the terminal device if the compared first and third values are a same value;

wherein the terminal device compares the second value calculated by the terminal device with the fourth value supplied from the IC memory card, and prohibits use of the connected IC memory card if the compared values are not the same.

2. The IC memory card system as set forth in claim 1, wherein the IC memory card prohibits supplying the fourth value to the terminal device when the IC memory card determines the first value supplied from the terminal device and the internally calculated third value are not a same value, and the terminal device prohibits use of the IC memory card when said fourth value is not received from the IC memory card.

3. The IC memory card system as set forth in claim 1, wherein the IC memory card comprises:

key value storage unit for storing a selected key value supplied from the terminal device;

first value storage unit for storing a first value supplied from the terminal device;

a third value operator for calculating a third value using a particular method based on the key value stored to the key value storage;

a fourth value operator for calculating a fourth value based on the key value using a different particular method;

fourth value storage unit for storing the fourth value calculated by the fourth value operator; and a comparator for detecting whether the first value stored to the first value storage unit and the third value calculated by the third value operator are a same value, and prohibiting output of the fourth value stored to the fourth value storage unit to the terminal device when said compared values are determined to be different.

4. The IC memory card system as set forth in claim 1, wherein the first and third values are separately calculated based on the key value using a same particular method, and the second and fourth values are separately calculated based on the key value using a same particular method that is different from the method used for calculating the first and third values.

5. The IC memory card system as set forth in claim 4, wherein the first through fourth values are each calculated based on a key value using an arithmetic function.

6. The IC memory card system as set forth in claim 4, wherein the key value is a value encrypted using a particular method, the first value and third value are obtained by decrypting the encrypted key value using a particular method, and the second value and fourth value are calculated using a particular arithmetic function based on the key value.

7. The IC memory card system as set forth in claim 4, wherein the key value is a value encrypted using a particular method, the first value and third value are calculated using a particular arithmetic function based on the key value, and the second value and fourth value are obtained by decrypting the encrypted key value using a particular method.

8. An IC memory card for use in an IC memory card system, said IC memory card system comprising an information processing device or other type of terminal device with an IC memory card connected thereto, said IC memory card comprising:

key value storage for storing a selected key value supplied from the terminal device;

first value storage for storing a first value calculated and supplied by the terminal device based on the key value;

a third value operator for calculating a third value using a particular method based on the key value stored to the key value storage;

a fourth value operator for calculating a fourth value based on the key value using a different particular method;

fourth value storage for storing the fourth value calculated by the fourth value operator; and a comparator for detecting whether the first value stored to the first value storage and the third value calculated by the third value operator are a same value, and prohibiting output of the fourth value stored to the fourth value storage to the terminal device when said compared values are determined to be different.

9. The IC memory card as set forth in claim 8, wherein the comparator supplies the fourth value to the terminal device in response to a request from the terminal device when the first value supplied from the terminal device and the third value are determined to be a same value.

10. The IC memory card as set forth in claim 8, wherein the third value is calculated using the same method used to calculate the first value based on a key value.

11. The IC memory card as set forth in claim 10, wherein the third and fourth values are calculated based on a key value using different arithmetic functions.

12. The IC memory card as set forth in claim 10, wherein the key value is a value encrypted using a particular method, the third value or the fourth value is obtained by decrypting the encrypted key value using a particular method, and the other value is calculated based on a key value using a particular arithmetic function.

* * * * *